United States Patent [19]

Smith et al.

[11] Patent Number: 4,849,201

[45] Date of Patent: Jul. 18, 1989

[54] PROCESS FOR PREPARING CHLORINATED LIME

[75] Inventors: Russell K. Smith, Dublin; Edward R. Zamejc, Columbus; James F. Miller, Lancaster, all of Ohio

[73] Assignee: The United States of America as represented by the Secretary of the Army, Washington, D.C.

[21] Appl. No.: 241,998

[22] Filed: Sep. 2, 1988

[51] Int. Cl.$^4$ .................... C01B 11/04; C01B 11/12; C01B 11/16

[52] U.S. Cl. .................................. 423/474; 423/475; 423/476

[58] Field of Search ....................... 423/474, 475, 476

[56] References Cited

U.S. PATENT DOCUMENTS 3,872,219  3/1975  Sakowski ........................... 423/474

Primary Examiner—Gregory A. Heller
Attorney, Agent, or Firm—Anthony T. Lane; Edward Goldberg; Edward F. Costigan

[57] ABSTRACT

A process for preparing chlorinated lime solid having an available chlorine content in the range of about 30 to about 50 weight percent by contacting a chlorine source, e.g., liquid chlorine, with a basic calcium-containing substance, e.g., hydrated lime, in the presence of water or aqueous calcium chlorine at a pH to produce an aqueous slurry having available chlorine content in the range of about 13 to 17 weight percent and a pH in the range of about 10.6 to 10.9 and containing an aqueous solution and a chlorinated lime precipitate combined with separating said slurry into an aqueous solution and a chlorinated lime precipitate having less than about 40 to 50 percent water combined with drying said chlorinated lime precipitate to produce chlorinated lime solid having the desired available chlorine content is disclosed.

8 Claims, 1 Drawing Sheet

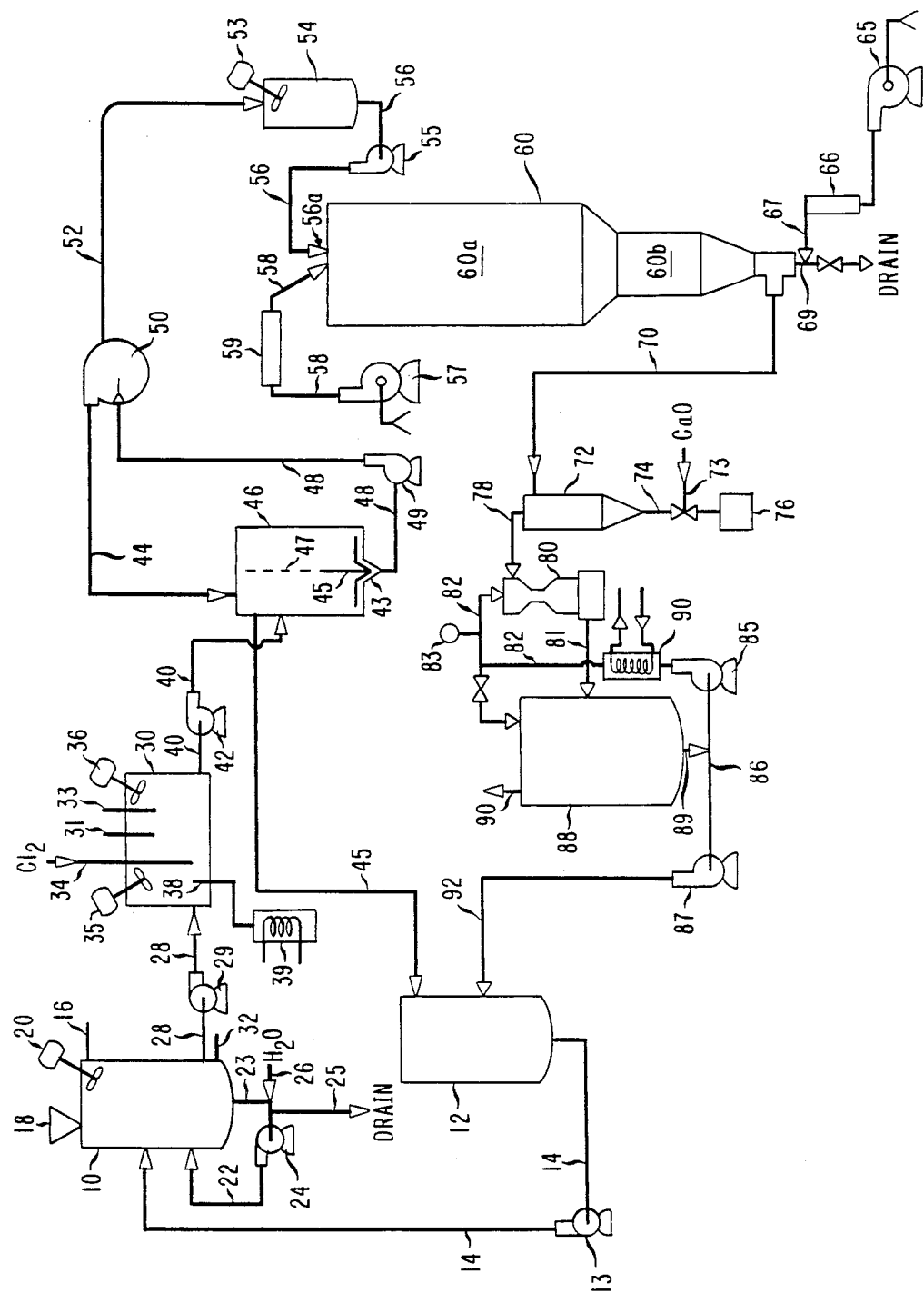

4,849,201

PROCESS FOR PREPARING CHLORINATED LIME

The invention described herein may be manufactured, used and licensed by or for the Government for Governmental purposes without payment to us of any royalties.

FIELD OF USE

This invention relates to a process for preparing chlorinated lime solid having an available chlorine content in the range of about 30 to about 50 weight percent.

SUMMARY OF THE INVENTION

The present invention provides a process for preparing chlorinated lime solid having an available chlorine content in the range of about 30 to about 50 weight percent which comprises (a) contacting a chlorine source selected from liquid chlorine, gaseous chlorine, calcium hypochlorite or hydrated calcium hypochlorite with a basic calcium-containing substance selected from lime, hydrated lime, spent supertropical bleach or mixtures thereof in the presence of water or an aqueous calcium chloride solution at a basic pH to produce an aqueous slurry having an available chlorine content in the range of about 10 to 17 weight percent and containing an aqueous solution and a chlorinated lime precipitate; (b) separating said slurry into an aqueous solution and a chlorinated lime precipitate having less than about 40–60 weight percent water; and (c) drying said chlorinated lime precipitate to produce a chlorinated lime solid having an available chlorine content in the range of about 30 to 50 weight percent.

BRIEF DESCRIPTION OF THE DRAWING

The sole FIGURE schematically illustrates a preferred embodiment of the process of the present invention.

DETAILED DESCRIPTION OF THE INVENTION AND OF THE PREFERRED EMBODIMENTS

We have discovered a process for preparing chlorinated lime having an available chlorine content in the range of about 30 to about 50 weight percent by use of a variety of starting materials including spent supertropical bleach[1] while controlling particulate emissions, aqueous solution and toxic gas, e.g., chlorine, chlorine monoxide, or HCl (g), emissions from the process. The particulate and toxic gas emissions from the process of the present invention are controlled and recycled along with aqueous solutions to the process. Because spent supertropical bleach can be converted into supertropical bleach having about 30–50 weight percent available chlorine, disposal of spent supertropical bleach is reduced.

[1] An admixture of chlorinated lime and calcium hydroxide, which is below the 10 percent available chlorine required for stockpile retention.

The process of the present invention may be practiced continuously or as a batch reaction. In either mode, the chlorine source is contacted, with agitation, with a basic calcium-containing substance in the presence of water or aqueous calcium chloride solution at a basic pH greater than 7.0 to produce an aqueous slurry having an available chlorine content in the range of about 10 to 17 weight percent. The aqueous slurry is separated—by use, for example, of a settling tank and centrifuge or filtration—into an aqueous solution and a chlorinated lime precipitate having less than about 40 to 50 weight percent water. The separated aqueous solution contains a reduced concentration of calcium hypochlorite and calcium chloride and may conveniently be recycled for contacting a chlorine source with basic calcium-containing substance to produce additional chlorinated lime in accordance with the process of the present invention. The chlorinated lime precipitate is dried by means of a vacuum drying oven or a spray drier to produce a chlorinated lime solid having an available chlorine content in the range of about 30 to 50 weight percent and preferably less than about 1 weight percent water.

The chlorine sources found useful in the present invention are gaseous chlorine, liquid chlorine, calcium hypochlorite or hydrated calcium hypochlorite. The gaseous chlorine and liquid chlorine should meet Federal specifications, and as such are available from Matheson Gas Products, East Rutherford, NJ. By the term "hydrated calcium hypochlorite" is meant calcium hypochlorite [$Ca(OCl)_2$] having one or more moles of water of hydration such as $Ca(OCl)_2.3H_2O$ available from Olin Chemicals, Stamford, CT. Reagent grade calcium hypochlorite, such as available from Fisher Scientific Co., East Rutherford, NJ, may also be used.

The basic calcium-containing substances useful in the present invention are selected from lime (CaO), hydrated lime, spent supertropical bleach or mixtures thereof. Lime calcined from calcium carbonate is appropriate, and as such, may be obtained from Fisher Scientific Company, Fair Lawn, NJ. Lime must be slaked for proper reaction. Hydrated lime may be obtained from Mississippi Lime Company, Jackson, Miss. The hydrated lime should be fully reactive. The term "spent supertropical bleach" as used herein means supertropical bleach having an available chlorine content of less than about 10 weight percent as measured by using ASTM procedure D-2022 employing potassium iodide and titration with sodium thiosulfate to clear, colorless endpoint using starch as an indicator.

The contacting of the chlorine source and a basis calcium-containing substance may be conducted in the presence of water alone, water containing calcium chloride (e.g., reagent grade calcium chloride), aqueous solution recovered from step (b) or mixtures thereof.

The contacting needs to take place at a basic pH, i.e., a pH above 7 as measured by commercially available pH probes.

The pressure of the contacting step of the process is not critical to formation of a chlorinated lime precipitate. The temperature of the contacting step is normally maintained in the range of about 20°–25° C. to facilitate gaseous chlorine adsorption. It should remain below 40° C. to minimize chlorate formation. The contacting step is exothermic; for this reason, chlorine is preferred to more easily control the temperature in the 20°–25° C. range.

The pressure is conveniently maintained at a pressure slightly higher than atmospheric when chlorine is used as the chlorine source. High pressure should be minimized in the contacting step for safety reasons.

The contacting step is best conducted in a premixer tank and a separate, stirred tank reactor.

Solids are admixed with water, aqueous calcium chloride or recycled liquor in a premixer tank. The so-formed slurry is forwarded to a stirred tank reactor into which liquid or gaseous chlorine is sparged if calcium hypochlorite is not used as the chlorine source. When the chlorine addition is complete, the contacting is continued with stirring for an additional period until the aqueous slurry has an available chlorine content in the range of about 13 to 17 weight percent. The available chlorine content of the slurry was measured by use of the above-described ASTM procedure on the "as-is" slurry removed from the contacting step (b) (prior to the separation step (c)). Typically such slurries have about 30 to 36 weight percent solids and can quickly be analyzed for available chlorine in about 10 minutes.

In a preferred embodiment of the process of this present invention where liquid or gaseous chlorine is used as the chlorine source, the contacting step (a) is continued until the pH of the aqueous slurry is in the range of about 10.6 and 10.9. A pH below about 10.6 indicates the onset of dissolution of the chlorinated lime precipitate (over-chlorination) while a pH above about 10.9 indicates that the endpoint of the reaction has not yet been reached (under-chlorination).

In a preferred embodiment of the process of the present invention wherein calcium hypochlorite or hydrated calcium hypochlorite is the chlorine source, and hydrated lime [$Ca(OH)_2$] is the basic calcium containing substance the contacting is conducted in the presence of aqueous calcium chloride in the following ratios: $Ca(OCl)_{2/Ca(OH)_2}=2.9$; $Ca(OH)_{2/100\ g\ of\ H_2O}=9$; and $CaCl_{2/100\ g\ of\ H_2O}=17$.

In another preferred embodiment of the process wherein gaseous chlorine is the chlorine source, chlorination rates of about 2.7 g/min/liter of solution, with agitation is acceptable and the preferred concentration of the other reactants, e.g., the basic calcium-containing substance, e.g., the lime, hydrated lime or spent supertropical bleach was found to depend on the total amount of solids present. The "total amount of solids" is defined as the amount of dissolved materials in the aqueous solution. The proportion of hydrated lime to aqueous solution and the recycled ratio, i.e., the proportion of aqueous solution recycled from the separation step (b) of the process, to water used as the starting aqueous solution for the contacting step (a) of the process, are important because make-up water must be added to the aqueous solution recycled from the separation step (b) in the continuous mode of the process. At high initial hydrated lime concentrations (15-17 weight percent), the recycle ratio (ratio of liquid recycled to that retained in the solids for spray drying) should be slightly less than 1.8. At low initial hydrated lime concentrations (about 10-13 weight percent), the recycle ratio should be slightly less than 6.0. A total solids to liquid ratio of 0.2 to 0.3 is preferred to maintain the final solids content at the end of contacting step (a) under 0.5—which final solids content appears to be the maximum allowable if the chlorinated lime precipitate is to be made having the desired available chlorine content.

In another preferred embodiment of the process of the present invention operated in the continuous mode wherein spent supertropical bleach is contacted with gaseous chlorine, at least some of the aqueous solution recovered in the separating step (b) must be purged in a bleed stream and fresh water added before the aqueous solution is recycled for use in another contacting step.

The separating step (b) may be conducted by use of vacuum filtration through fast media (Whatman No. 4 paper) at a rate of about 41.2 mL/cm$^2$-hour (150 gallons/feet$^2$-minute); in the continuous mode of the process of the present invention, a settling tank in combination with a centrifuge is conveniently used. Whichever means of separating the aqueous solution from the chlorinated lime precipitate is used, it is critical that the water content of the chlorinated lime precipitate fed to the drying step (c) of the process be less than about 40 to 50 weight percent in order to obtain a chlorinated lime product having the desired available chlorine content.

The drying step may be conducted by use of a vacuum dryer oven operated at about 60°-140° C. and reduced pressure of about 100-300 mmHg when the drying process is operated batchwise. In the operation of the process of the invention in a continuous mode, a spray dryer or flash dryer is used. In either mode the dryer emissions are scrubbed with water or recycle liquor containing calcium hydroxide to remove particles and toxic gases, e.g., chlorine, chlorine monoxide, and hydrogen chloride. The chlorine values are recovered by recycling the spent scrubber solution to the mixing step (a) for use as make-up aqueous solution.

The chlorinated lime recovered from the drying step and having the desired available chlorine content (as measured by the above described ASTM procedure) is admixed with about 0.1 to about 6 weight percent, preferably about 3 to about 6 weight percent calcium oxide to form supertropical bleach having the desired available chlorine content. Supertropical bleach having less than the desired available 30 weight percent of chlorine may be used as basic calcium-containing substance in the contacting step (a) to produce the desired chlorinated lime product.

The process of the present invention is better illustrated by reference to the schematic of the sole FIGURE. The embodiment illustrated consists of a premixer 10, a stirred tank reactor/digestor 30, settling tank or clarifier 46, a centrifuge 50, a dryer 60, scrubber or sparging tank 88 and recycle liquor storage tank 12. The tank and pipes may be constructed of high density polyethylene or epoxy-coated corrosion-resistant steel. The pumps conveniently having a body constructed of polypropylene with a liner of the Hypalon ® brand of chlorinated and sulfonated polyethylene.

With reference to the FIGURE, premixer tank (10) is filled with recycle liquor from recycle liquid storage tank 12 via line 14 containing pump 13 or with water fed via lines 26 and 22 containing pump 24 to high level point 16 in premix tank 10. Hydrated lime, spent supertropical bleach and/or a mixture of calcium hypochlorite and calcium chloride or spent supertropical bleach is added to the premixer tank 10 via funnel 18. A recycle pump 24 in lines 22 and 23 and agitator 20 are used to mix the slurry by continuously recycling the slurry through premix tank 10 until a homogeneous slurry is formed therein. The so-formed slurry is transferred via line 28 and pump 29 into reactor/digestor tank 30 until the slurry in the premixer tank 10 reaches the low level point 32. The pump 29 in line 28 is then turned off and the premixer tank 10 is filled to the high level point and the sequence is repeated. In reactor 30, liquid or gaseous chlorine is sparged through pipe 34 having multiple holes therein into the slurry in reactor/digestor 30 when calcium hypochlorite is not added to premixer tank 10 as the chlorine source.

For production of 200 lbs/hr of supertropical bleach, tank 30 is constructed to be 3 feet wide×5 feet long×3 feet high. Such a tank, constructed of polyethylene and supported on a steel stand, has sufficient size for a slurry residence time of about 70 minutes which includes a 40 minute digestion time after reaction.

Tank 30 is equipped with heat exchanger 38 and coil 39, an inlet port for adding the slurry in line 29 from premixer 10 and outlet port connected to line 40 to remove chlorinated lime slurry, redox probe 31, pH probe 33 and agitators 35 and 36. The chlorination reaction in tank 30 is controlled by regulation of the chlorine flow into the slurry. The temperature of the slurry in tank 30 is maintined between about 20°-25° C. by regulation of the coolant flow in heat exchanger coil 39. Use of liquid chlorine is preferred as liquid chlorine lessens the cooling load for the reaction. After about 70 minutes or when the pH is in the range of about 10.60 and 10.9, preferably about 10.65 and 10.82 when chlorine is used as the chlorine source, the chlorinated slurry is pumped from reactor 30 via pump 42 in line 40 into clarifier 46. The clarifier 46 is normally a five foot diameter, 620 gallon capacity epoxy-coated mild steel tank supported on a steel stand. Clarifier 46 is equipped with baffel 47, rake 45, and an overflow trough around the top rim by which recycle liquor is removed and forwarded via line 45 to recycle tank 12. Rake 45 is contoured to the bottom of the cone-shaped portion of the clarifier 46. The rake 45 rotates very slowly (about 2 rotations/hour) to prevent remixing of the clorinated lime precipitate with aqueous solution. Baffle 47 is installed in clarifier 46 to insure that the slurry does not swirl therein. Partially concentrated chlorinated lime slurry is removed from 46 via outlet 43 to line 48 containing pump 49 to centrifuge 50 and then via line 52 to dryer feed tank 54 equipped with agitator 53. Tank 54 may be cone-shaped and constructed of polyethylene. The centrifuge 50 further concentrates the chlorinated lime slurry transferred from clarifier 46 to remove at least about 50 weight percent, preferably 50–60 weight percent, of the water before the chlorinated lime slurry is passed to the dryer 60. Recycle liquor is removed from centrifuge 50 via line 44 to clarifier 46. The concentrated chlorinated lime slurry having a water content of no more than about 50 weight percent is directed via line 52 to agitated dryer feed tank 54. The concentrated chlorinated lime slurry is pumped from dryer feed tank 54 via line 56 containing pump 55 to dryer 60 wherein the water content of the chlorinated lime is reduced from about 50 weight percent to less than 2 weight percent, preferably less than 1 weight percent. The dryer 60 is fabricated of carbon steel coated on the inside with a Teflon ® layer for corrosion protection and insulated on the outside to minimize heat losses. The dryer 60 combines two stages; a first stage 60(a) for spray drying and a second stage 60(b) for fluidized bed drying. The concentrated chlorinated line slurry in line 56 is pumped through atomizing spray nozzle 56(a) into dryer 60. The concentrated slurry is sprayed into the first stage 60(a) of dryer 60 wherein it contacts downwardly flowing air heated to 600° F. by heater 59 in line 58 equipped with blower 57. The slurry particles are partially dried from about 50 weight percent water to about 5 weight percent water as such particles fall, at a rapid rate, into the fluidized bed second stage 60(b) of dryer 60. A high pressure blower 65 directs air through resistance heater 66 in line 67 into the second (optionally lower) fluidized bed section 60(b). This air, heated to a temperature of about 250° F., causes fluidization of the dried particles of chlorinated lime. The dried particles are removed from dryer 60 via line 70 into cyclone 72. The dried particles of chlorinated lime are removed from cyclone 72 via line 74 into which lime (CaO) is added via line 73. The so-formed dry supertropical bleach product is admixed in product receiver 76. The exhaust air, at a temperature of about 200°-275° F., is removed from cyclone 72 via line 78 to venturi scrubber 80 to remove entrapped chlorinated lime particles. The air from venturi scrubber 80 is fed via line 81 to sparging tank 88 wherein residual particles and chlorine gas are scrubbed by contact with an aqueous calcium hydroxide slurry. A portion of the scrubber liquor is removed from sparging tank 88 via lines 89 and 86 through pump 85 and line 82 containing pressure gauge 33 and heat exchanger 90 to venturi scrubber 80.

Another portion of the scrubber liquor is removed from sparger tank 88 via lines 89 and 86 through pump 87 and line 92 to recycle liquor tank 12. The scrubber tank 88 is a 1500 gallon capacity cylindrical tank equipped with a sparger (not shown), an exhaust duct 90, valves and controls and is constructed of polyethylene.

A preferred embodiment of the present invention has been presented to more particularly illustrate the operation of the invention to produce 200 lb/hr of supertropical bleach having the desired available chlorine content. It will be apparent to those of ordinary skill in this art that various changes and modifications may be made therein without departing from the scope and spirit of the invention.

What is claimed is:

1. A process of preparing supertropical bleach having an available chlorine content in the range of about 30 to about 50 weight percent which comprises (a) contacting liquid or gaseous chlorine with a basic calcium-containing substance selected from lime, hydrated lime, spent supertropical bleach or mixtures thereof in the presence of water or an aqueous calcium chloride solution at a basic pH to produce an aqueous slurry having a pH in the range of about 10.6 and 10.9 and containing an aqueous solution and chlorinated lime precipitate; (b) separating said slurry into an aqueous solution and a chlorinated lime precipitate having a water content of less than about 40 to 50 weight percent; (c) drying said chlorinated lime precipitate to produce chlorinated lime solid having an available chlorine content in the range of about 30 to 50 weight percent; and (d) admixing about 0.1 to about 6 weight percent calcium oxide with the chlorinated lime solid of step (c) to produce supertropical bleach having an available chlorine content in the range of about 30 to about 50 weight percent.

2. A process of claim 1 wherein in step (a) liquid chlorine is used as the chlorine source.

3. A process of claim 1 wherein in step (a) hydrated lime is used as the basic calcium-containing substance.

4. A process of claim 1 wherein in step (a) a mixture of hydrated lime and spent supertropical bleach is used as the basic calcium-containing substance.

5. A process of claim 1 wherein in step (a) the contacting is performed in the presence of an aqueous calcium chloride solution.

6. A process of claim 5 wherein at least a portion of the aqueous calcium chloride solution is recycled from step (b) of a previous run.

7. A process of claim 1 wherein in step (c) a vacuum dryer operating at a temperature of about 60° to 140° C. is used to dry the chlorinated lime precipitate.

8. A process of claim 1 wherein in step (c) a spray dryer operating at a temperature of about 40° to 105° C. is used to dry the chlorinated lime precipitate.

* * * * *